(12) United States Patent
Li et al.

(10) Patent No.: US 10,390,325 B2
(45) Date of Patent: Aug. 20, 2019

(54) POSITIONING METHOD AND DEVICE

(71) Applicant: Huawei Technologies Co., Ltd., Shenzhen (CN)

(72) Inventors: Anjian Li, Beijing (CN); Jie Cui, Shenzhen (CN); Jing Han, Beijing (CN); Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/636,468

(22) Filed: Jun. 28, 2017

(65) Prior Publication Data

US 2017/0303231 A1 Oct. 19, 2017

Related U.S. Application Data

(63) Continuation of application No. PCT/CN2014/095321, filed on Dec. 29, 2014.

(51) Int. Cl.
*H04W 64/00* (2009.01)
*H04W 8/24* (2009.01)
*H04W 88/06* (2009.01)

(52) U.S. Cl.
CPC ............ *H04W 64/00* (2013.01); *H04W 8/24* (2013.01); *H04W 88/06* (2013.01)

(58) Field of Classification Search
CPC ....... H04W 4/025; H04W 64/00; H04W 8/24; H04W 88/06; H04B 7/024
USPC ...................................................... 455/556.1
See application file for complete search history.

(56) References Cited

U.S. PATENT DOCUMENTS

| | | | |
|---|---|---|---|
| 2001/0034238 A1 | 10/2001 | Voyer | |
| 2003/0064735 A1 | 4/2003 | Spain et al. | |
| 2009/0286552 A1 | 11/2009 | Wu | |
| 2011/0217989 A1 | 9/2011 | Fodor et al. | |
| 2012/0184302 A1* | 7/2012 | Kazmi | H04W 64/00 455/456.5 |
| 2014/0235266 A1* | 8/2014 | Edge | H04W 64/00 455/456.1 |

(Continued)

FOREIGN PATENT DOCUMENTS

| | | |
|---|---|---|
| CN | 1322100 A | 11/2001 |
| CN | 1897746 A | 1/2007 |
| CN | 101339238 A | 1/2009 |

(Continued)

*Primary Examiner* — Charles N Appiah
*Assistant Examiner* — Nicole M Louis-Fils

(57) ABSTRACT

Embodiments of the present disclosure relate to the field of communications technologies, and disclose a positioning method and device, so as to resolve a prior-art problem of relatively low positioning precision caused by a relatively long message transmission delay. A specific solution is as follows: A positioning controller: sends, to a user device, a message that carries positioning auxiliary information including an identifier of a first base station and an identifier of at least one second base station; receives a message that carries a positioning measurement result; obtains location information of the first base station and location information of the at least one second base station; and determines location information of the user device according to the positioning measurement result, the location information of the first base station, and the location information of the at least one second base station.

17 Claims, 5 Drawing Sheets

(56) References Cited

U.S. PATENT DOCUMENTS

2014/0256348 A1\* 9/2014 Wirola .................. H04W 64/00
                                                        455/456.1
2015/0181552 A1\* 6/2015 Bajko ................... H04W 64/00
                                                        455/456.2

FOREIGN PATENT DOCUMENTS

| CN | 102210180 A | 10/2011 |
|----|-------------|---------|
| EP | 2666329 A1  | 11/2013 |
| WO | 2012099517 A1 | 7/2012 |

\* cited by examiner

POSITIONING METHOD AND DEVICE

CROSS-REFERENCE TO RELATED APPLICATION

This application is a continuation of International Application No. PCT/CN2014/095321, filed on Dec. 29, 2014, the disclosure of which is hereby incorporated by reference in its entirety.

TECHNICAL FIELD

The present application relates to the field of communications technologies, and in particular, to a positioning method and device.

BACKGROUND

In recent years, with rapid development of mobile communications technologies, wireless positioning technologies have attracted increasing attention of people. There are different positioning controllers in different communications systems, and a positioning controller can perform positioning on a user device that accesses a communications system in which the positioning controller is located.

Using a positioning architecture of a Long Term Evolution (LTE) system as an example, a positioning controller in the LTE system is an evolved serving mobile location center (e-SMLC). As shown in FIG. 1, if a user device has accessed the LTE system currently, the e-SMLC may exchange data with the user device by using a mobility management entity (MME) and an evolved NodeB (eNodeB). The e-SMLC may receive a positioning measurement result (including a result of measurement performed by the user device on a received signal from a base station in the LTE system) in the LTE system that is reported by the user device, and determine location information of the user device according to the positioning measurement result, so as to implement positioning of the user device.

However, because in the prior art, a positioning controller (such as an e-SMLC) needs to exchange data with a user device by using a core network device (such as an MME) and an access network device (such as an eNodeB), a message transmission delay is relatively long. In addition, if the user device moves in a positioning process, a positioning measurement result received by the positioning controller is a positioning measurement result obtained through measurement performed by the user device before the movement, and a location of the user device calculated by the positioning controller according to the received positioning measurement result is actually a location in which the user device is located before the movement but is not a location in which the user device is located after the movement. Therefore, positioning precision is relatively low.

SUMMARY

Embodiments of the present disclosure provide a positioning method and device, to resolve a prior-art problem of relatively low positioning precision caused by a relatively long message transmission delay.

According to a first aspect of the embodiments of the present disclosure, a positioning method is provided, including:

sending, by a positioning controller to a user device, a message that carries positioning auxiliary information, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device;

receiving, by the positioning controller, a message that carries a positioning measurement result and that is sent by the user device, where the positioning measurement result includes results of measurement performed by the user device on the signals of the first base station and the at least one second base station;

obtaining, by the positioning controller, location information of the first base station that is identified by the identifier of the first base station and location information of the at least one second base station that is identified by the identifier of the at least one second base station; and determining, by the positioning controller, location information of the user device according to the positioning measurement result, the location information of the first base station, and the location information of the at least one second base station.

With reference to the first aspect, in a first possible implementation manner, the at least one second base station includes a base station belonging to a communications system different from a communications system to which the first base station belongs.

With reference to the first aspect or the first possible implementation manner of the first aspect, in a second possible implementation manner, before the sending, by a positioning controller to a user device, a message that carries positioning auxiliary information, the method further includes:

receiving, by the positioning controller, a message that carries access capability information of the user device and that is sent by the user device, where the access capability information is used to indicate a communications system that the user device can access.

With reference to the second possible implementation manner of the first aspect, in a third possible implementation manner, the at least one second base station is a base station, which belongs to the communications system that the user device can access and that is indicated by the access capability information, in neighboring base stations of the first base station.

With reference to the second possible implementation manner of the first aspect or the third possible implementation manner of the first aspect, in a fourth possible implementation manner, before the sending, by a positioning controller to a user device, a message that carries positioning auxiliary information, the method further includes:

obtaining, by the positioning controller, the identifier of the first base station; and obtaining, by the positioning controller, the identifier of the at least one second base station according to the identifier of the first base station.

With reference to the fourth possible implementation manner of the first aspect, in a fifth possible implementation manner, the obtaining, by the positioning controller, the identifier of the at least one second base station according to the identifier of the first base station includes:

determining, by the positioning controller, the at least one second base station in the neighboring base stations of the first base station according to the identifier of the first base station and the access capability information.

With reference to the first aspect or anyone of the foregoing possible implementation manners, in a sixth possible implementation manner, the at least one second base station further includes a base station belonging to the same communications system to which the first base station belongs.

According to a second aspect of the embodiments of the present disclosure, a positioning method is provided, including:

receiving, by a user device, a message that carries positioning auxiliary information and that is sent by a positioning controller, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device;

obtaining, by the user device, a positioning measurement result according to the identifier of the first base station and the identifier of the at least one second base station, where the positioning measurement result includes results of measurement performed by the user device on the signals of the first base station and the at least one second base station; and sending, by the user device to the positioning controller, a message that carries the positioning measurement result, so that the positioning controller determines location information of the user device according to the positioning measurement result.

With reference to the second aspect, in a first possible implementation manner, before the receiving, by a user device, a message that carries positioning auxiliary information and that is sent by a positioning controller, the method further includes:

sending, by the user device to the positioning controller, a message that carries access capability information of the user device, where the access capability information is used to indicate a communications system that the user device can access.

According to a third aspect of the embodiments of the present disclosure, a positioning controller is provided, including:

a sending unit, configured to send, to a user device, a message that carries positioning auxiliary information, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device;

a receiving unit, configured to receive a message that carries a positioning measurement result and that is sent by the user device, where the positioning measurement result includes results of measurement performed by the user device on the signals of the first base station and the at least one second base station; and a processing unit, configured to obtain location information of the first base station that is identified by the identifier of the first base station and location information of the at least one second base station that is identified by the identifier of the at least one second base station; and determine location information of the user device according to the positioning measurement result, the location information of the first base station, and the location information of the at least one second base station.

With reference to the third aspect, in a first possible implementation manner, the at least one second base station includes a base station belonging to a communications system different from a communications system to which the first base station belongs.

With reference to the third aspect or the first possible implementation manner of the third aspect, in a second possible implementation manner, the receiving unit is further configured to: before the sending unit sends, to the user device, the message that carries the positioning auxiliary information, receive a message that carries access capability information of the user device and that is sent by the user device, where the access capability information is used to indicate a communications system that the user device can access.

With reference to the second possible implementation manner of the third aspect, in a third possible implementation manner, the at least one second base station is a base station, which belongs to the communications system that the user device can access and that is indicated by the access capability information, in neighboring base stations of the first base station.

With reference to the second possible implementation manner of the third aspect or the third possible implementation manner of the third aspect, in a fourth possible implementation manner, the processing unit is further configured to: before the sending unit sends, to the user device, the message that carries the positioning auxiliary information, obtain the identifier of the first base station, and obtain the identifier of the at least one second base station according to the identifier of the first base station.

With reference to the fourth possible implementation manner of the third aspect, in a fifth possible implementation manner, the processing unit is further configured to determine the at least one second base station in the neighboring base stations of the first base station according to the identifier of the first base station and the access capability information.

With reference to the third aspect or anyone of the foregoing possible implementation manners, in a sixth possible implementation manner, the at least one second base station further includes a base station belonging to the same communications system to which the first base station belongs.

According to a fourth aspect of the embodiments of the present disclosure, a user device is provided, including:

a receiving unit, configured to receive a message that carries positioning auxiliary information and that is sent by a positioning controller, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device;

a processing unit, configured to obtain a positioning measurement result according to the identifier of the first base station and the identifier of the at least one second base station, where the positioning measurement result includes results of measurement performed by the user device on the signals of the first base station and the at least one second base station; and a sending unit, configured to send, to the positioning controller, a message that carries the positioning measurement result, so that the positioning controller determines location information of the user device according to the positioning measurement result.

With reference to the fourth aspect, in a first possible implementation manner, the sending unit is further configured to: before the receiving unit receives the message that carries the positioning auxiliary information and that is sent by the positioning controller, send, to the positioning controller, a message that carries access capability information of the user device, where the access capability information is used to indicate a communications system that the user device can access.

According to the positioning method and device provided in the embodiments of the present disclosure, because a positioning controller is an access network device, the positioning controller may send, to a user device, a message that carries positioning auxiliary information without using a core network device, and the positioning controller may also receive a message that carries a positioning measurement result and that is sent by the user device without using the core network device. Compared with relatively low positioning precision caused by a long message transmission delay generated when data exchange between the positioning controller and the user device is performed by using the core network device and an access network device in the prior art, by means of the positioning method provided in the embodiments of the present disclosure, the core network device does not need to be used during the data exchange between the positioning controller and the user device, so that the message transmission delay is relatively short. Therefore, positioning precision can be improved.

DETAILED DESCRIPTION

Figure 1:
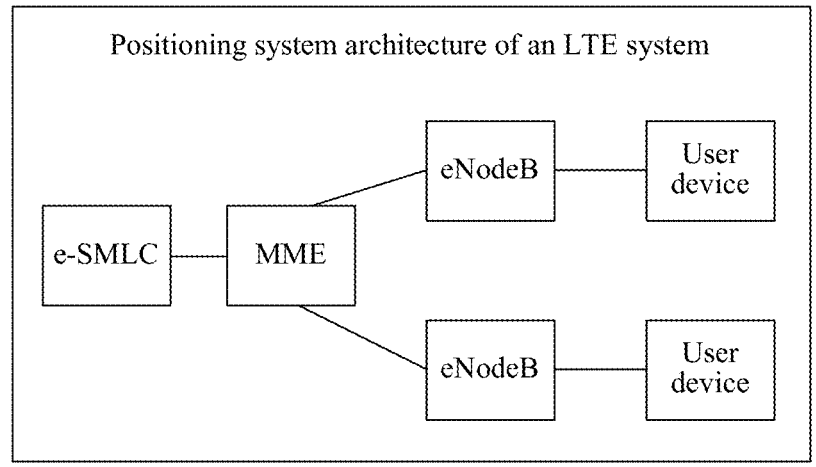
FIG. 1 is a schematic diagram of a positioning system architecture of an LTE system in the prior art.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Technologies described in this specification may be applied to various wireless communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term. Evolution (LTE) system, and other communications systems.

Various aspects are described in this specification with reference to a terminal and/or a base station and/or a base station controller.

A user device may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device (UD), or user equipment (UE).

The base station (for example, an access point) may be a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be a base station (BTS) in GSM or the CDMA, or may be a base station (NodeB) in the WCDMA, or may be an evolved NodeB (eNodeB) in the LTE, which is not limited in the present disclosure.

In addition, the terms "system" and "network" may be used interchangeably in this specification.

Figure 2:
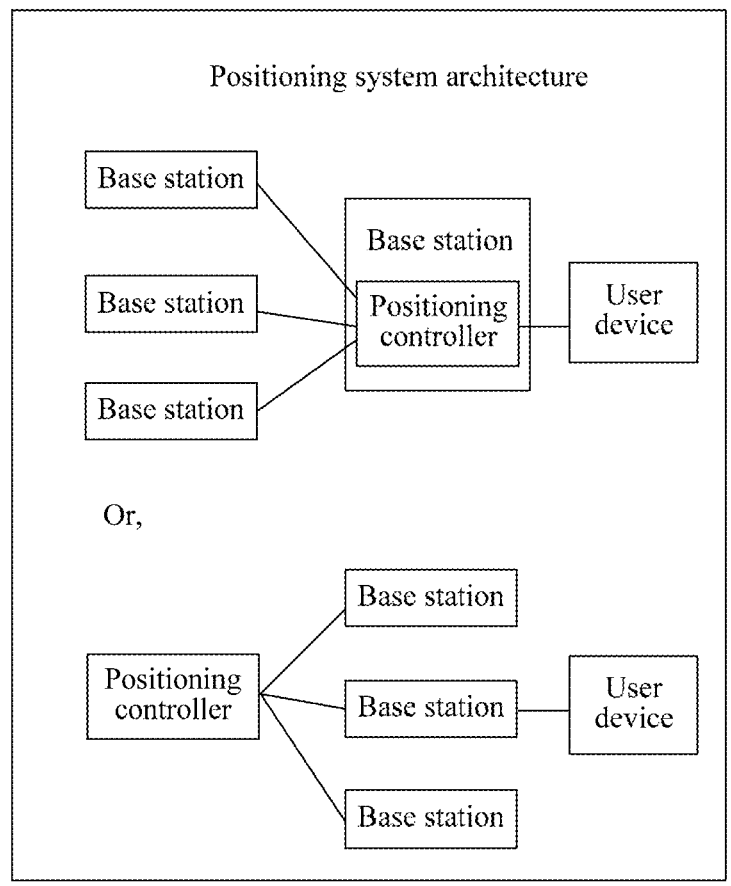
FIG. 2 is a schematic diagram of a positioning system architecture according to an embodiment of the present disclosure.

FIG. 2 is a schematic diagram of a positioning system architecture according to an embodiment of the present disclosure. A positioning controller is an access network device. The positioning controller is integrated into a base station in a form of a module, or may be an independent device. Base stations in FIG. 2 may be base stations in a same communications system, or may be base stations indifferent communications systems. When the positioning controller is integrated into the base station, the positioning controller may directly exchange data with a user device. When the positioning controller is an independent device, the positioning controller exchanges data with the user device by using the base station.

Figure 3:
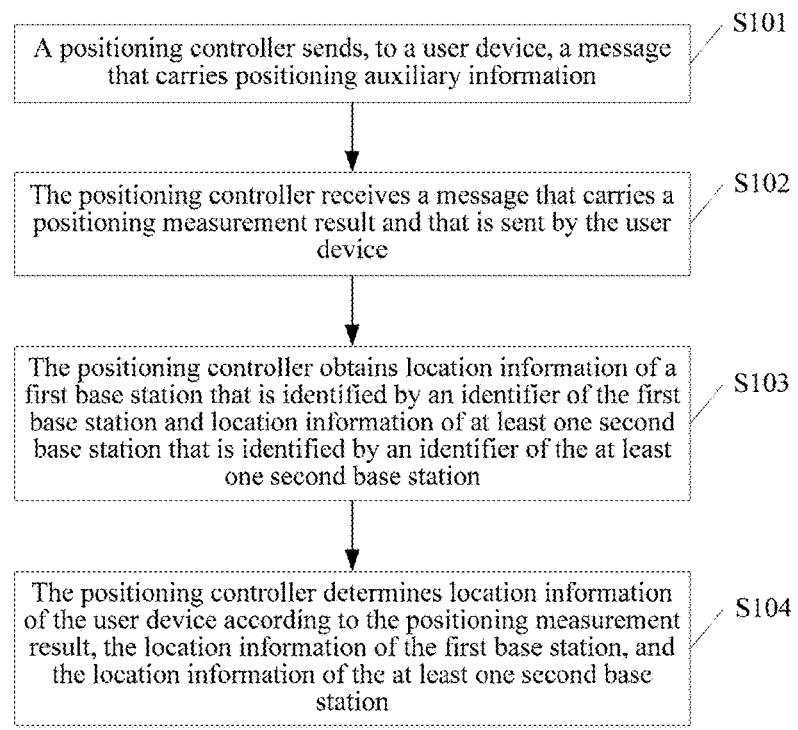
FIG. 3 is a flowchart of a positioning method according to an embodiment of the present disclosure.

This embodiment describes a positioning method according to an embodiment of the present disclosure from a perspective of a positioning controller. As shown in FIG. 3, the positioning method according to this embodiment of the present disclosure includes:

S101: A positioning controller sends, to a user device, a message that carries positioning auxiliary information.

The positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, and the at least one second base station is a neighboring base station of the first base station.

Optionally, when the positioning controller is integrated into the first base station, the positioning controller may directly send, to the user device, the message that carries the positioning auxiliary information; and when the positioning controller is an independent device, the positioning controller may send, to the user device by using the first base station, the message that carries the positioning auxiliary information.

Because the message that carries the positioning auxiliary information is used to instruct the user device to measure signals transmitted by the first base station and the at least one second base station, that is, only when the user device receives the message that carries the positioning auxiliary information and that is sent by the positioning controller, the user device performs corresponding measurement, it needs to be ensured that the user device can receive the message that carries the positioning auxiliary information and that is sent by the positioning controller. Optionally, after receiving the message that carries the positioning auxiliary information and that is sent by the positioning controller, the user device returns a first message response to the positioning controller. The first message response is used to notify the positioning controller that the user device has received the message that carries the positioning auxiliary information and that is sent by the positioning controller. If the positioning controller does not receive, in a preset time, the first message response sent by the user device, the positioning controller needs to send the message that carries the positioning auxiliary information again to the user device.

S102: The positioning controller receives a message that carries a positioning measurement result and that is sent by the user device.

The positioning measurement result includes results of measurement performed by the user device on the signals of the first base station and the at least one second base station.

The positioning measurement result may specifically include: a signal strength of a signal from the first base station and a signal strength of a signal from the at least one second base station, where the signals are received by the user device. Generally, there are multiple neighboring base stations of the first base station, that is, the at least one second base station includes multiple base stations. The positioning measurement result may also include: a time difference between a moment at which the user device receives a signal from the first base station and a moment at which the user device receives a signal from a base station in the at least one second base station; or a time difference between a moment at which the user device receives a signal from a base station in the at least one second base station and a moment at which the user device receives a signal from another base station in the at least one second base station. Certainly, the positioning measurement result may also include other content, and specific content of the positioning measurement result is not limited in this embodiment of the present disclosure.

S103: The positioning controller obtains location information of a first base station that is identified by an identifier of the first base station and location information of at least one second base station that is identified by an identifier of the at least one second base station.

Specifically, the positioning controller may send a location information request message to the first base station according to the identifier of the first base station, so as to request the first base station to report the location information of the first base station to the positioning controller; the positioning controller may send a location information request message to the at least one second base station according to the identifier of the at least one second base station, so as to request the at least one second base station to report the location information of the at least one second base station to the positioning controller. The location information may be specifically latitude and longitude coordinates.

Certainly, the positioning controller may also obtain other positioning-related information of the first base station that is identified by the identifier of the first base station and other positioning-related information of the at least one second base station that is identified by the identifier of the at least one second base station. Other positioning-related information includes: a transmitted signal strength of a base station, coverage of a base station, a positioning reference signal transmission period, and the like.

S104: The positioning controller determines location information of the user device according to the positioning measurement result, the location information of the first base station, and the location information of the at least one second base station.

The positioning controller may determine a distance between the user device and the first base station and a distance between the user device and the at least one second base station according to the positioning measurement result, and may finally determine the location information of the user device according to the distance between the user device and the first base station, the distance between the user device and the at least one second base station, the location information of the first base station, and the location information of the at least one second base station.

For example, if the at least one second base station includes a base station L2 and a base station L3, the positioning measurement result includes: a time difference T1 between a moment at which the user device receives a signal from the first base station and a moment at which the user device receives a signal from the base station L2; and a time difference T2 between the moment at which the user device receives the signal from the first base station and a moment at which the user device receives a signal from the base station L3. Then, the positioning controller may determine, according to an observed time difference of arrival (OTDOA) positioning method, that the user device is located on a hyperbola on which a location of the first base station and a location of the base station L2 are focal points, and the user device is also located on a hyperbola on which the location of the first base station and a location of the base station L3 are focal points, that is, the user device is located at an intersection point of the two hyperbolas. Then the positioning controller may determine the location information of the user device with reference to the location information of the first base station, the location information of the base station L2, and the location information of the base station L3. For specific description of the OTDOA positioning method, refer to related content in the prior art, and details are not described in this embodiment of the present disclosure.

It should be noted that the foregoing method is merely an example, the positioning controller may also use another positioning method, such as a cell identifier (Cell-ID) positioning method and a time of arrival (TOA) positioning method, to determine the location information of the user device. This embodiment of the present disclosure does not limit the positioning method used by the positioning controller.

According to the positioning method provided in this embodiment of the present disclosure, because a positioning controller is an access network device, the positioning controller may send, to a user device, a message that carries positioning auxiliary information without using a core network device, and the positioning controller may also receive a message that carries a positioning measurement result and that is sent by the user device without using the core network device. Compared with relatively low positioning precision caused by a long message transmission delay generated when data exchange between the positioning controller and the user device is performed by using the core network device and an access network device in the prior art, by means of the positioning method provided in this embodiment of the present disclosure, the core network device does not need to be used during the data exchange between the positioning controller and the user device, so that the message transmission delay is relatively short. Therefore, positioning precision can be improved.

Further, the at least one second base station includes a base station belonging to a communications system different from a communications system to which the first base station belongs.

Further, the at least one second base station further includes a base station belonging to the same communications system to which the first base station belongs.

Figure 4:
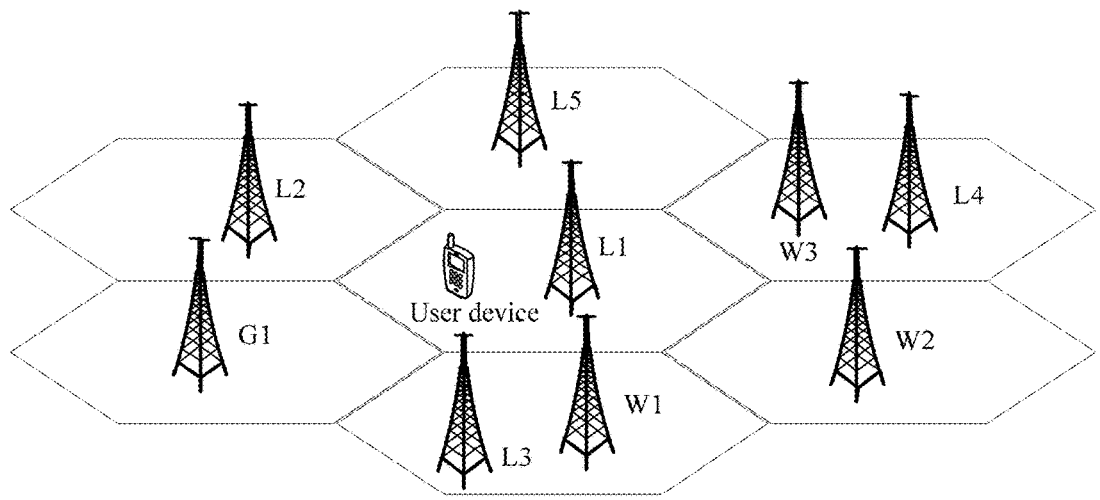
FIG. 4 is a schematic diagram of a network deployment according to an embodiment of the present disclosure.

For an example, as shown in FIG. 4, the user device accesses an LTE system currently. A base station L1 of the LTE system is a serving base station of the user device, that is, the first base station is the base station L1. Neighboring base stations of the base station L1 include: abase station L2 of the LTE system, abase station L3 of the LTE system, a base station L4 of the LTE system, a base station L5 of the LTE system, a base station G1 of a GSM system, a base station W1 of a WCDMA system, a base station W2 of the WCDMA system, and a base station W3 of the WCDMA system. The user device may not be able to receive signals from all the neighboring base stations of the base station L1. If the user device can receive only a signal from the base station L2, a signal from the base station L3, a signal from the base station G1, a signal from the base station W1, a signal from the base station W2, and a signal from the base station W3, the at least one second base station includes: the base station L2, the base station L3, the base station G1, the base station W1, the base station W2, and the base station W3. Because the positioning controller may not predetermine base stations from which the user device can receive signals, in addition to the identifier of the first base station and the identifier of the at least one second base station, the auxiliary information in S101 may further include an identifier of another base station, such as an identifier of the base station L4 and an identifier of the base station L5.

Correspondingly, the positioning measurement result includes results of measurement performed by the user device on signals of base stations in multiple communications systems. Using FIG. 4 as an example, the positioning measurement result may specifically include: a signal strength of a signal that is from the base station L1 and that is received by the user device, a signal strength of a signal that is from the base station L2 and that is received by the user device, a signal strength of a signal that is from the base station L3 and that is received by the user device, a signal strength of a signal that is from the base station G1 and that is received by the user device, a signal strength of a signal that is from the base station W1 and that is received by the user device, a signal strength of a signal that is from the base station W2 and that is received by the user device, and a signal strength of a signal that is from the base station W3 and that is received by the user device. The positioning measurement result may further include: a time difference between a moment at which the user device receives a signal from the base station L1 and a moment at which the user device receives a signal from the base station L2, a time difference between the moment at which the user device receives the signal from the base station L1 and a moment at which the user device receives a signal from the base station L3, and the like.

For example, if results of measurement performed by the user device on received signals from base stations in the LTE system includes: a time difference between a moment at which the user device receives a signal from the base station L1 and a moment at which the user device receives a signal from the base station L2; and a time difference between the moment at which the user device receives the signal from the base station L1 and a moment at which the user device receives a signal from the base station L3, the positioning controller may determine, according to the observed time difference of arrival (OTDOA) positioning method, the location information of the user device with reference to location information of the base station L1, location information of the base station L2, and location information of the base station L3.

If a result of measurement performed by the user device on a received signal from the base station of the GSM system includes a signal strength of a signal that is from the base station G1 and that is received by the user device (received signal strength), the positioning controller may obtain location information of the base station G1, a signal strength (transmitted signal strength) of a signal transmitted by the base station G1, an azimuth of the signal transmitted by the base station G1, and a channel fading model of a channel between the base station G1 and the user device. Then the positioning controller may calculate a distance (denoted as R) between the user device and the base station G1 according to the received signal strength, the transmitted signal strength, and the channel fading model. The user device is located on a circle, where location coordinates of the base station G1 are used as a center of the circle and R is used as a radius of the circle. Finally, the positioning controller determines the location information of the user device according to the location information of the base station G1, the azimuth of the signal transmitted by the base station G1, and the distance between the user device and the base station G1.

If results of measurement performed by the user device on received signals from base stations in the WCDMA system includes: a signal strength of a signal that is from the base station W1 and that is received by the user device, a signal strength of a signal that is from the base station W2 and that is received by the user device, and a signal strength of a signal that is from the base station W3 and that is received by the user device, by means of the similar method in the foregoing GSM system, the positioning controller may determine that the user device is located on a circle in which location coordinates of the base station W1 are used as a center of the circle, the user device is also located on a circle in which location coordinates of the base station W2 are used as a center of the circle, and the user device is also located on a circle in which location coordinates of the base station W3 are used as a center of the circle. Therefore, the positioning controller may determine that an intersection point of the three circles is a location in which the user device is located, so that the location information of the user device is determined.

In this way, the positioning controller may determine one piece of location information of the user device according to the results of measurement performed by the user device on the received signals from the base stations in the LTE system; determine one piece of location information of the user device according to the result of the measurement performed by the user device on the received signal from the base station of the GSM system; and determine one piece of location information of the user device according to the results of measurement performed by the user device on the received signals from the base stations in the WCDMA system. Due to an existence of a measurement error, the foregoing three pieces of location information determined by the positioning controller may not be the same, and the positioning controller may use any one of the foregoing three pieces of location information as the final location information of the user device.

To improve positioning precision, the positioning controller may also send a confidence request to the user device, so as to request the user device to add, when the user device reports a measurement result, a confidence of the measurement result, where the confidence is used to represent credibility of the measurement result. The confidence of the measurement result is determined by the user device. Specifically, the user device is interfered when receiving a signal from a base station, and the user device may determine the confidence of the measurement result according to a strength, a signal to interference plus noise ratio, and the like of a current interfering signal. For example, a confidence of a measurement result in which a strength of an interfering signal is small or a signal to interference plus noise ratio of an interfering signal is large may be set to a relatively large value, and a confidence of measurement result in which a strength of an interfering signal is large or a signal to interference plus noise ratio of an interfering signal is small may be set to a relatively small value. The positioning controller may select, according to values of confidences from the foregoing three pieces of location information, location information that corresponds to a positioning measurement result whose confidence is high as the final location information of the user device.

Certainly, the positioning controller may also combine the positioning measurement results of the communications systems that are reported by the user device to determine the location information of the user device.

However, in the prior art, the positioning controller performs positioning on a user device by using only a resource of a communications system, and if a positioning measurement result reported by the user device to the positioning controller is incorrect due to an environment factor (such as environmental interference), accuracy of the location information of the user device that is determined by the positioning controller is low (that is, positioning precision is low). Compared with the prior art, by means of the positioning method provided in this embodiment of the present disclosure, the positioning controller may fully use resources of multiple communications systems to perform positioning on a user device, and although a positioning measurement result of a communications system that is reported by the user device to the positioning controller is incorrect, the positioning controller may also determine the location information of the user device according to positioning measurement results of other communications systems that are reported by the user device, thereby improving the positioning precision.

Further, before the sending, by the positioning controller to a user device, a message that carries positioning auxiliary information, the positioning method provided in this embodiment of the present disclosure may further include:

receiving, by the positioning controller, a message that carries access capability information of the user device and that is sent by the user device, where the access capability information is used to indicate a communications system that the user device can access.

Further, the at least one second base station is abase station, which belongs to the communications system that the user device can access and that is indicated by the access capability information, in neighboring base stations of the first base station.

Further, before the sending, by the positioning controller to a user device, a message that carries positioning auxiliary information, the positioning method provided in this embodiment of the present disclosure may further include:

obtaining, by the positioning controller, the identifier of the first base station; and obtaining, by the positioning controller, the identifier of the at least one second base station according to the identifier of the first base station, where the obtaining, by the positioning controller, the identifier of the at least one second base station according to the identifier of the first base station specifically includes: determining, by the positioning controller, the at least one second base station in the neighboring base stations of the first base station according to the identifier of the first base station and the access capability information.

The positioning controller may pre-store a correspondence between the user device and the serving base station of the user device and pre-store correspondences between the serving base station and the neighboring base stations of the serving base station. The positioning controller may search, according to an identifier of the to-be-positioned user device, the positioning controller for the pre-stored correspondence between the user device and the serving base station of the user device, so as to obtain the identifier of the serving base station (that is, the first base station) of the to-be-positioned user device. The positioning controller searches, according to the identifier of the first base station, the positioning controller for the pre-stored correspondences between the first base station and the neighboring base stations of the first base station, so as to obtain identifiers of the neighboring base stations of the first base station; and then the positioning controller determines the at least one second base station in the neighboring base stations of the first base station according to the access capability information.

For an example, if the user device can access the GSM system and the LTE system, before sending, to the user device, the message that carries the positioning auxiliary information, the positioning controller receives the message that carries the access capability information of the user device and that is sent by the user device, where the access capability information is used to indicate that the user device can access the GSM system and the LTE system. As shown in FIG. 4, the first base station is the base station L1, and the neighboring base stations of the base station L1 include: the base station L2, the base station L3, the base station L4, the base station L5, the base station G1, the base station W1, the base station W2, and the base station W3. The positioning controller determines, in the neighboring base stations of the first base station according to the identifier of the first base station and the access capability information, that the at least one second base station includes: the base station L2, the base station L3, the base station L4, the base station L5, and the base station G1. The identifier of the at least one second base station sent by the positioning controller to the user device includes only an identifier of the base station (the base station G1) in the GSM system, identifiers of the base stations (the base station L2, the base station L3, the base station L4, and the base station L5) in the LTE system, and does not include identifiers of the base stations (the base station W1, the base station W2, and the base station W3) in the WCDMA system, to avoid waste of resources caused by useless information sent by the positioning controller to the user device.

Figure 5:
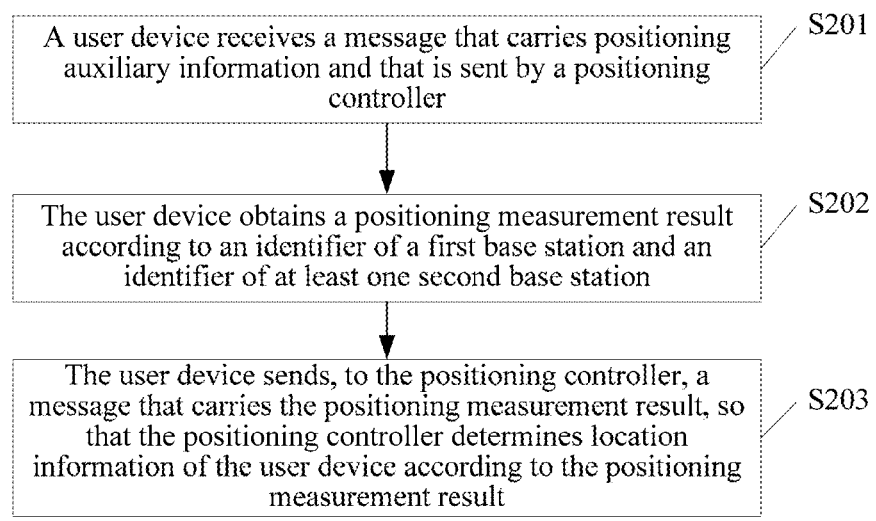
FIG. 5 is a flowchart of another positioning method according to an embodiment of the present disclosure.

This embodiment describes a positioning method according to an embodiment of the present disclosure from a perspective of a user device. As shown in FIG. 5, the positioning method according to an embodiment of the present disclosure includes:

S201: The user device receives a message that carries positioning auxiliary information and that is sent by a positioning controller.

The positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device.

The at least one second base station may include abase station belonging to a communications system different from a communications system to which the first base station belongs, and may further include a base station belonging to the same communications system to which the first base station belongs, that is, the positioning auxiliary information may include identifiers of base stations of multiple communications systems.

Optionally, when the positioning controller is integrated into the first base station, the user device may directly receive the message that carries the positioning auxiliary information and that is sent by the positioning controller; and when the positioning controller is an independent device, the user device may receive, by using the first base station, the message that carries the positioning auxiliary information and that is sent by the positioning controller.

For specific description of the positioning auxiliary information, refer to the description in S101, and details are not described in this embodiment of the present disclosure again.

S202: The user device obtains a positioning measurement result according to an identifier of a first base station and an identifier of at least one second base station.

The positioning measurement result includes results of measurement performed by the user device on the signals of the first base station and the at least one second base station.

For specific description of the positioning measurement result, refer to the description in S102, and details are not described in this embodiment of the present disclosure again.

The at least one second base station may include a base station belonging to a communications system different from a communications system to which the first base station belongs, and may further include a base station belonging to the same communications system to which the first base station belongs, and the base station belonging to the same communications system to which the first base station belongs includes a base station whose frequency is the same as a frequency of the first base station and a base station whose frequency is different from the frequency of the first base station. Therefore, in an idle time of communication between the user device and the first base station, the user device needs to perform measurement on a signal transmitted by the base station whose frequency is different from the frequency of the first base station and that is in the at least one second base station, and perform measurement on a signal transmitted by the base station that is in the at least one second base station and that belongs to a communications system different from the communications system to which the first base station belongs, so as to obtain the positioning measurement result.

S203: The user device sends, to the positioning controller, a message that carries the positioning measurement result, so that the positioning controller determines location information of the user device according to the positioning measurement result.

Optionally, when the positioning controller is integrated into the first base station, the user device may directly send, to the positioning controller, the message that carries the positioning measurement result; and when the positioning controller is an independent device, the user device may send, to the positioning controller by using the first base station, the message that carries the positioning measurement result.

It should be noted that, only after receiving the message that carries the positioning measurement result and that is sent by the user device, the positioning controller can determine a location of the user device. Therefore, it needs to be ensured that the positioning controller can receive the message that carries the positioning measurement result and that is sent by the user device. Optionally, after receiving the message that carries the positioning measurement result and that is sent by the user device, the positioning controller returns a second message response to the user device. The second message response is used to notify the user device that the positioning controller has received the message that carries the positioning measurement result and that is sent by the user device. If the user device does not receive, in a preset time, the second message response sent by the positioning controller, the user device needs to send, to the positioning controller again, the message that carries the positioning measurement result.

According to the positioning method provided in this embodiment of the present disclosure, because a positioning controller is an access network device, a user device may receive a message that carries positioning auxiliary information and that is sent by the positioning controller without using a core network device, and the user device may also send, to the positioning controller, a message that carries a positioning measurement result without using the core network device. Compared with relatively low positioning precision caused by a long message transmission delay generated when data exchange between the positioning controller and the user device is performed by using the core network device and an access network device in the prior art, by means of the positioning method provided in this embodiment of the present disclosure, the core network device does not need to be used during the data exchange between the positioning controller and the user device, so that the message transmission delay is relatively short. Therefore, positioning precision can be improved.

Further, before the receiving, by the user device, a message that carries positioning auxiliary information and that is sent by a positioning controller, the positioning method provided in this embodiment of the present disclosure may further include:

sending, by the user device to the positioning controller, a message that carries access capability information of the user device, where the access capability information is used to indicate a communications system that the user device can access, so that the identifier of the at least one second base station included in the positioning auxiliary information is only an identifier of a base station in the communications system that the user device can access, thereby avoiding waste of resources caused by useless information sent by the positioning controller to the user device.

Figure 6:
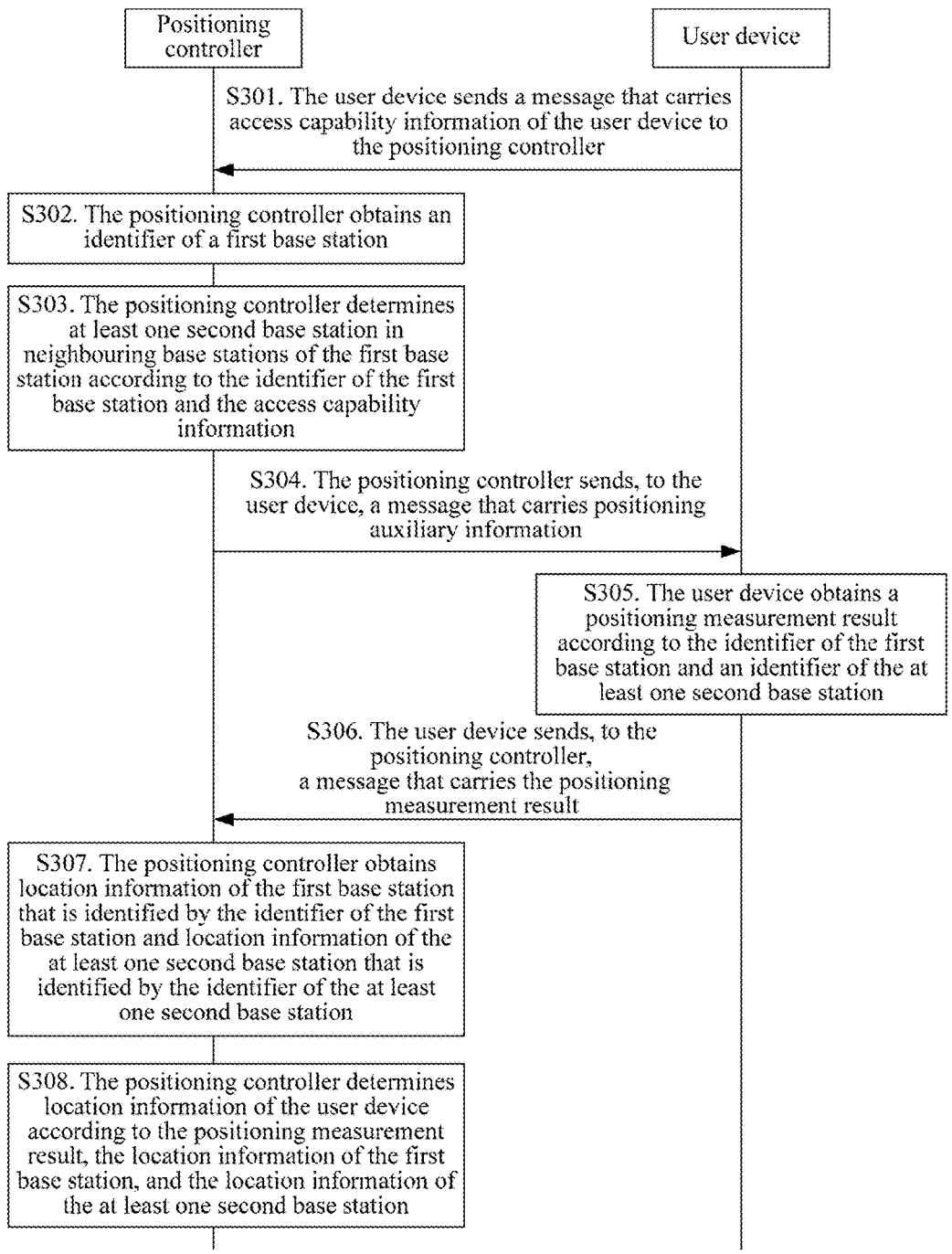
FIG. 6 is a flowchart of another positioning method according to an embodiment of the present disclosure.

An embodiment describes a positioning method according to an embodiment of the present disclosure from a perspective of interaction between a positioning controller and a user device. As shown in FIG. 6, the positioning method according to this embodiment of the present disclosure includes:

S301: A user device sends a message that carries access capability information of the user device to a positioning controller.

The positioning controller is an access network device, and the access capability information is used to indicate a communications system that the user device can access.

For an example, if the user device can access a GSM system and an LTE system, the access capability information is used to indicate the GSM system and the LTE system.

S302: The positioning controller obtains an identifier of a first base station.

The first base station is a serving base station of the user device.

S303: The positioning controller determines at least one second base station in neighboring base stations of the first base station according to the identifier of the first base station and the access capability information.

The at least one second base station is a base station, which belongs to the communications system that the user device can access and that is indicated by the access capability information, in the neighboring base stations of the first base station. The at least one second base station may include a base station belonging to a communications system different from a communications system to which the first base station belongs, and the at least one second base station may further include a base station belonging to the same communications system to which the first base station belongs.

S304: The positioning controller sends, to the user device, a message that carries positioning auxiliary information.

The positioning auxiliary information includes the identifier of the first base station and an identifier of the at least one second base station, and the message that carries the positioning auxiliary information is used to instruct the user device to measure signals transmitted by the first base station and the at least one second base station.

For specific description of the positioning auxiliary information, refer to the description in S101, and details are not described in this embodiment of the present disclosure again.

S305: The user device obtains a positioning measurement result according to the identifier of the first base station and an identifier of the at least one second base station.

The positioning measurement result includes results of measurement performed by the user device on the signals of the first base station and the at least one second base station.

For specific description of the positioning measurement result, refer to the description in S102, and details are not described in this embodiment of the present disclosure again.

S306: The user device sends, to the positioning controller, a message that carries the positioning measurement result.

S307: The positioning controller obtains location information of the first base station that is identified by the identifier of the first base station and location information of the at least one second base station that is identified by the identifier of the at least one second base station.

S308: The positioning controller determines location information of the user device according to the positioning measurement result, the location information of the first base station, and the location information of the at least one second base station.

For a specific process of determining, by the positioning controller, the location information of the user device according to the positioning measurement result, the location information of the first base station, and the location information of the at least one second base station, refer to the related description in other method embodiments, and details are not described in this embodiment of the present disclosure again.

In the positioning method provided in this embodiment of the present disclosure, because a positioning controller is an access network device, the positioning controller may send, to a user device, a message that carries positioning auxiliary information without using a core network device, and the positioning controller may also receive a message that carries a positioning measurement result and that is sent by the user device without using the core network device. Compared with relatively low positioning precision caused by a long message transmission delay generated when data exchange between the positioning controller and the user device is performed by using the core network device and an access network device in the prior art, by means of the positioning method provided in this embodiment of the present disclosure, the core network device does not need to be used during the data exchange between the positioning controller and the user device, so that the message transmission delay is relatively short. Therefore, positioning precision can be improved.

Figure 7:
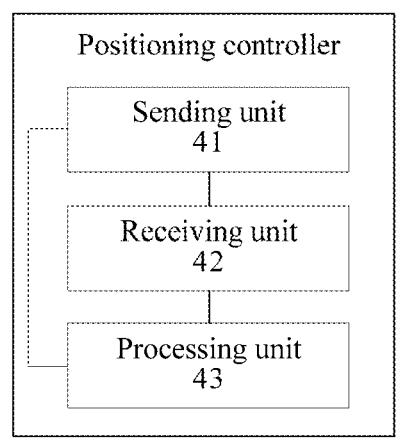
FIG. 7 is a schematic composition diagram of a positioning controller according to an embodiment of the present disclosure.

An embodiment of the present disclosure provides a positioning controller, configured to perform the positioning method shown in FIG. 3 and FIG. 6. As shown in FIG. 7, the positioning controller includes: a sending unit 41, a receiving unit 42, and a processing unit 43.

The sending unit 41 may be a transmitter, the receiving unit 42 may be a receiver, and the processing unit 43 may be a processor.

The sending unit 41 is configured to send, to a user device, a message that carries positioning auxiliary information, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device.

The receiving unit 42 is configured to receive a message that carries a positioning measurement result and that is sent by the user device, where the positioning measurement result includes results of measurement performed by the user device on the signals of the first base station and the at least one second base station.

The processing unit 43 is configured to obtain location information of the first base station that is identified by the identifier of the first base station and location information of the at least one second base station that is identified by the identifier of the at least one second base station; and determine location information of the user device according to the positioning measurement result, the location information of the first base station, and the location information of the at least one second base station.

Further, the at least one second base station includes a base station belonging to a communications system different from a communications system to which the first base station belongs.

Further, the receiving unit 42 is further configured to: before the sending unit 41 sends, to the user device, the message that carries the positioning auxiliary information, receive a message that carries access capability information of the user device and that is sent by the user device, where the access capability information is used to indicate a communications system that the user device can access.

Further, the at least one second base station is abase station, which belongs to the communications system that the user device can access and that is indicated by the access capability information, in neighboring base stations of the first base station.

Further, the processing unit 43 is further configured to: before the sending unit 41 sends, to the user device, the message that carries the positioning auxiliary information, obtain the identifier of the first base station, and obtain the identifier of the at least one second base station according to the identifier of the first base station.

Further, the processing unit 43 is further configured to determine the at least one second base station in the neighboring base stations of the first base station according to the identifier of the first base station and the access capability information.

Further, the at least one second base station further includes a base station belonging to the same communications system to which the first base station belongs.

It should be noted that, for specific descriptions of some functional modules in the positioning controller provided in this embodiment of the present disclosure, refer to corresponding content in the method embodiments, and details are not described again in this embodiment.

According to the positioning controller provided in this embodiment of the present disclosure, because the positioning controller is an access network device, the positioning controller may send, to a user device, a message that carries positioning auxiliary information without using a core network device, and the positioning controller may also receive a message that carries a positioning measurement result and that is sent by the user device without using the core network device. Compared with relatively low positioning precision caused by a long message transmission delay generated when data exchange between the positioning controller and the user device is performed by using the core network device and an access network device in the prior art, by means of the positioning method provided in this embodiment of the present disclosure, the core network device does not need to be used during the data exchange between the positioning controller and the user device, so that the message transmission delay is relatively short. Therefore, positioning precision can be improved.

Figure 8:
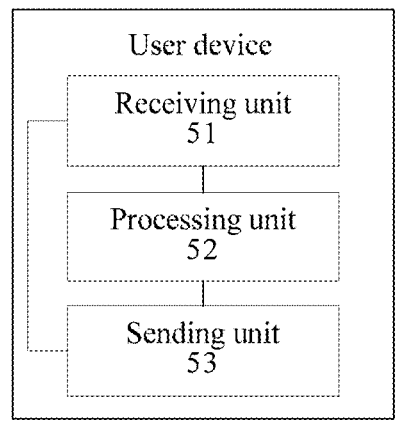
FIG. 8 is a schematic composition diagram of a user device according to an embodiment of the present disclosure.

An embodiment of the present disclosure provides a user device, configured to perform the positioning method shown in FIG. 5 and FIG. 6. As shown in FIG. 8, the user device includes: a receiving unit 51, a processing unit 52, and a sending unit 53.

The receiving unit 51 may be a receiver, the processing unit 52 may be a processor, and the sending unit 53 may be a transmitter.

The receiving unit 51 is configured to receive a message that carries positioning auxiliary information and that is sent by a positioning controller, where the positioning auxiliary information includes an identifier of a first base station and an identifier of at least one second base station, and the message that carries the positioning auxiliary information is used to instruct the user device to measure signals transmitted by the first base station and the at least one second base station, where the first base station is a serving base station of the user device, the at least one second base station is a neighboring base station of the first base station, and the positioning controller is an access network device.

The processing unit 52 is configured to obtain a positioning measurement result according to the identifier of the first base station and the identifier of the at least one second base station, where the positioning measurement result includes results of measurement performed by the user device on the signals of the first base station and the at least one second base station.

The sending unit 53 is configured to send, to the positioning controller, a message that carries the positioning measurement result, so that the positioning controller determines location information of the user device according to the positioning measurement result.

Further, the sending unit 53 is further configured to: before the receiving unit 51 receives the message that carries the positioning auxiliary information and that is sent by the positioning controller, send, to the positioning controller, a message that carries access capability information of the user device, where the access capability information is used to indicate a communications system that the user device can access.

It should be noted that, for specific descriptions of some functional modules in the user device provided in this embodiment of the present disclosure, refer to corresponding content in the method embodiments, and details are not described again in this embodiment.

According to the user device provided in this embodiment of the present disclosure, because a positioning controller is an access network device, the user device may receive a message that carries positioning auxiliary information and that is sent by the positioning controller without using a core network device, and the user device may also send, to the positioning controller, a message that carries a positioning measurement result without using the core network device. Compared with relatively low positioning precision caused by a long message transmission delay generated when data exchange between the positioning controller and the user device is performed by using the core network device and an access network device in the prior art, by means of the positioning method provided in this embodiment of the present disclosure, the core network device does not need to be used during the data exchange between the positioning controller and the user device, so that the message transmission delay is relatively short. Therefore, positioning precision can be improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or apart of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A positioning method, comprising:
    sending, by a positioning controller to a user device, a first message carrying positioning auxiliary information comprising an identifier of a first base station, an identifier of a second base station, an identifier of a third base station, and an identifier of a fourth base station, wherein the first message is for indicating to the user device to measure signals transmitted by the first, second, third, and fourth base stations, and wherein the first base station is a serving base station of the user device, the second, third, and fourth base stations are neighboring base stations of the first base station, and the positioning controller is an access network device;
    receiving, by the positioning controller, a second message carrying a positioning measurement result sent by the user device, wherein the positioning measurement result comprises results of measurement performed by the user device on the signals transmitted by the first, second, third, and fourth base stations;
    obtaining, by the positioning controller, location information of the first base station identified by the identifier of the first base station, location information of the second base station identified by the identifier of the second base station, location information of the third base station identified by the identifier of the third base station, and location information of the fourth base station identified by the identifier of the fourth base station;
    determining, by the positioning controller, first location information of the user device according to the positioning measurement result, the location information of the first base station, and the location information of the second base station;
    determining, by the positioning controller, second location information of the user device according to the positioning measurement result, the location information of the third base station, and the location information of the fourth base station; and
    determining, by the positioning controller, location information of the user device by comparing the first location information of the user device and the second location information of the user device,
    wherein the third and fourth base stations belong to a communications system different from the communications system to which the second base station belongs.

2. The method according to claim 1, wherein before sending, by a positioning controller to a user device, a first message carrying positioning auxiliary information, the method further comprises:
    receiving, by the positioning controller, a message carrying access capability information of the user device sent by the user device, wherein the access capability information indicates a communications system that the user device can access.

3. The method according to claim 2, wherein the second, third, and fourth base stations are neighboring base stations of the first base station, and the second base station belongs to the communications system the user device can access.

4. The method according to claim 2, wherein before sending to a user device, by a positioning controller, a first message carrying positioning auxiliary information, the method further comprises:
  obtaining, by the positioning controller, the identifier of the first base station; and
  obtaining, by the positioning controller, the identifier of the second, third, and fourth base stations according to the identifier of the first base station.

5. The method according to claim 4, wherein obtaining, by the positioning controller, the identifier of the second base station according to the identifier of the first base station comprises:
  determining, by the positioning controller, the second base station in the one or more neighboring base stations of the first base station according to the identifier of the first base station and the access capability information.

6. The method according to claim 1, wherein the second base station belongs to the same communications system to which the first base station belongs.

7. A positioning controller, comprising:
  a transmitter, configured to send, to a user device, a first message carrying positioning auxiliary information comprising an identifier of a first base station, an identifier of a second base station, an identifier of a third base station, and an identifier of a fourth base station, wherein the first message is for instructing the user device to measure signals transmitted by the first, second, third, and fourth base stations, and wherein the first base station is a serving base station of the user device, the second, third, and fourth base stations are neighboring base stations of the first base station, and the positioning controller is an access network device;
  a receiver, configured to receive a second message carrying a positioning measurement result sent by the user device, wherein the positioning measurement result comprises results of measurement performed by the user device on the signals transmitted by the first, second, third, and fourth base stations; and
  a processor, configured to:
    obtain location information of the first base station identified by the identifier of the first base station, location information of the second base station identified by the identifier of the second base station, location information of the third base station identified by the identifier of the third base station, and location information of the fourth base station identified by the identifier of the fourth base station,
    determine first location information of the user device according to the positioning measurement result, the location information of the first base station, and the location information of the second base station,
    determine second location information of the user device according to the positioning measurement result, the location information of the third base station, and the location information of the fourth base station, and
    determine location information of the user device by comparing the first location information of the user device and the second location information of the user device;
  wherein the third and fourth base stations belong to a communications system different from the communications system to which the second base station belongs.

8. The positioning controller according to claim 7, wherein the receiver is further configured to:
  before the transmitter sends, to the user device, the first message, receive a message carrying access capability information of the user device sent by the user device, wherein the access capability information indicates a communications system the user device can access.

9. The positioning controller according to claim 8, wherein the second, third, and fourth base stations are neighboring base stations of the first base station and the second base station, and the second base station belongs to the communications system the user device can access.

10. The positioning controller according to claim 8, wherein the processor is further configured to:
  before the transmitter sends, to the user device, the first message, obtain the identifier of the first base station, and obtain the identifier of the second, third, and fourth base stations according to the identifier of the first base station.

11. The positioning controller according to claim 10, wherein the processor is further configured to:
  determine the second base station in the one or more neighboring base stations of the first base station according to the identifier of the first base station and the access capability information.

12. The positioning controller according to claim 7, wherein the second base station belongs to the same communications system to which the first base station belongs.

13. A user device, comprising:
  a receiver, configured to receive a first message carrying positioning auxiliary information sent by a positioning controller, wherein the positioning auxiliary information comprises an identifier of a first base station, an identifier of a second base station, an identifier of a third base station, and an identifier of a fourth base station, wherein the first message is for instructing the user device to measure signals transmitted by the first, second, third, and fourth base stations, and wherein the first base station is a serving base station of the user device, the second, third, and fourth base stations are neighboring base stations of the first base station, and the positioning controller is an access network device;
  a processor, configured to obtain a positioning measurement result according to the identifiers of the first, second, third, and fourth base stations, wherein the positioning measurement result comprises results of measurement performed by the user device on the signals transmitted by the first, second, third, and fourth base stations; and
  a transmitter, configured to send, to the positioning controller, a second message carrying the positioning measurement result, wherein the positioning measurement result is for (i) determining first location information of the user device according to the positioning measurement result and location information of the first and second base stations, (ii) determining second location information of the user device according to the positioning measurement result and location information of the third and fourth base stations, and (iii) determining location information of the user device by comparing the first location information of the user device and the second location information of the user device;
  wherein the third and fourth base stations belong to a communications system different from the communications system to which the second base station belongs.

14. The user device according to claim 13, wherein the transmitter is further configured to:
- before the receiver receives the first message, send, to the positioning controller, a message carrying access capability information of the user device, wherein the access capability information indicates a communications system the user device can access.

15. The method according to claim 1, wherein the first location information of the user device is determined by the positioning controller using a first positioning method and the second location information of the user device is determined by the positioning controller using a second positioning method different from the first positioning method.

16. The method according to claim 1, further comprising:
- sending, by the positioning controller to the user device, a confidence request to the user device, the confidence request for instructing the user device to include a confidence of the positioning measurement result in the second message.

17. The method according to claim 15, wherein the first positioning method comprises an observed time difference of arrival (OTDOA) positioning method, and the second positioning method comprises an intersection point of circles method.

* * * * *